US008271734B1

(12) United States Patent
Glasco et al.

(10) Patent No.: US 8,271,734 B1
(45) Date of Patent: Sep. 18, 2012

(54) METHOD AND SYSTEM FOR CONVERTING DATA FORMATS USING A SHARED CACHE COUPLED BETWEEN CLIENTS AND AN EXTERNAL MEMORY

(75) Inventors: David B. Glasco, Austin, TX (US);
Peter B. Holmqvist, Cary, NC (US);
George R. Lynch, Raleigh, NC (US);
Patrick R. Marchand, Apex, NC (US);
Karan Mehra, Carey, NC (US); James Roberts, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 508 days.

(21) Appl. No.: 12/329,345

(22) Filed: Dec. 5, 2008

(51) Int. Cl.
*G06F 13/00* (2006.01)
(52) U.S. Cl. .................. 711/130; 345/546; 345/555
(58) Field of Classification Search .................. 711/130; 345/546, 555
See application file for complete search history.

(56) References Cited

U.S. PATENT DOCUMENTS

| | | | | |
|---|---|---|---|---|
| 5,909,225 A * | 6/1999 | Schinnerer et al. | ........... | 345/545 |
| 5,936,616 A * | 8/1999 | Torborg et al. | ................. | 345/555 |
| 6,483,516 B1 * | 11/2002 | Tischler | ........................ | 345/552 |
| 6,657,631 B1 * | 12/2003 | Schinnerer | ..................... | 345/502 |
| 7,242,400 B2 * | 7/2007 | Van Hook et al. | ............ | 345/418 |
| 7,286,134 B1 * | 10/2007 | Van Dyke et al. | ............ | 345/544 |
| 7,545,382 B1 * | 6/2009 | Montrym et al. | ............. | 345/530 |
| 7,808,507 B1 * | 10/2010 | Van Dyke et al. | ............ | 345/558 |
| 7,884,829 B1 * | 2/2011 | Van Dyke et al. | ............ | 345/544 |
| 2003/0188135 A1 * | 10/2003 | Sheaffer | ........................ | 712/221 |
| 2005/0144388 A1 * | 6/2005 | Newburn et al. | .............. | 711/118 |
| 2006/0047916 A1 * | 3/2006 | Ying et al. | ..................... | 711/144 |
| 2007/0153014 A1 * | 7/2007 | Sabol | ............................ | 345/557 |
| 2007/0159488 A1 * | 7/2007 | Danskin et al. | ............... | 345/505 |

* cited by examiner

*Primary Examiner* — Sanjiv Shah
*Assistant Examiner* — Glenn Gossage
(74) *Attorney, Agent, or Firm* — Patterson & Sheridan, LLP (57) ABSTRACT

A system and method for converting data from one format to another in a processing pipeline architecture. Data is stored in a shared cache that is coupled between one or more clients and an external memory. The shared cache provides storage that is used by multiple clients rather than being dedicated to separately convert the data format for each client. Each client may interface with the memory using a different format, such as a compressed data format. Data is converted to the format expected by the particular client as it is read from the cache and output to the client during a read operation. Bytes of a cache line may be remapped to bytes of an unpack register for output to a naïve client, which may be configured to perform texture mapping operations. Data is converted from the client format to the memory format as it is stored into the cache during a write operation.

20 Claims, 10 Drawing Sheets

Cache Lines 536

| Byte0 550 | Byte1 551 | . . . | Byte15 552 | Byte64 557 | . . . | Byte78 558 | Byte79 559 |
|---|---|---|---|---|---|---|---|
| Byte16 560 | Byte17 561 | . . . | Byte31 562 | Byte80 567 | . . . | Byte94 568 | Byte95 569 |

Naïve Client Data Layout 537

| Byte0 550 | Byte1 551 | . . . | Byte15 552 | Byte16 560 | Byte17 561 | . . . | Byte31 562 |
|---|---|---|---|---|---|---|---|
| Byte64 557 | . . . | Byte78 558 | Byte79 559 | Byte80 567 | . . . | Byte94 568 | Byte95 569 |

METHOD AND SYSTEM FOR CONVERTING DATA FORMATS USING A SHARED CACHE COUPLED BETWEEN CLIENTS AND AN EXTERNAL MEMORY

FIELD OF THE INVENTION

The present invention relates generally to the field of data processing and, more specifically, to using a data cache to format data transferred between a processor and memory.

DESCRIPTION OF THE RELATED ART

In a conventional processor data read from memory by a processor is converted to the format expected by the processor and data written to memory by the processor is converted to the storage format before the data is stored in memory. Since the format conversion may require a reorganization of the data, buffers are typically deployed within the processor to temporarily store the data and are also used during the reformatting operation. The buffers are dedicated storage rather than a shared resource.

As the foregoing illustrates, what is needed in the art is a mechanism for efficiently formatting data while minimizing the use of dedicated storage.

SUMMARY OF THE INVENTION

A system and method for buffering data that is read from memory and written to memory by multiple clients are disclosed in which data is stored in a shared cache while the data is converted from one format to another. One advantage of the disclosed method is that the shared cache provides storage that is used by multiple clients rather than being dedicated to separately buffer data for each client. Each one of the clients that accesses the data may interface with the memory using a different format. The data is converted to the format expected by the particular client as it is read from the cache and output to the client during a read operation. The data is converted from the client format to the memory format as it is stored into the cache during a write operation.

Various embodiments of a method of the invention for using a cache coupled to one or more clients and to an external memory include receiving a read request for a target storing target data represented in a first format from a naïve client, wherein the naïve client does not support the first format, identifying a first cache line of the cache that stores a first portion of the target data specified by the read request, and identifying a second cache line of the cache that stores a second portion of the target data specified by the read request. Bytes of the first cache line are read and remapped to bytes of an unpack register for output to the naïve client, wherein the remapping is based on a second format that is supported by the naïve client.

Various embodiments of a method of the invention for using a cache coupled to one or more clients and to an external memory include receiving a write request including write data for a target storing target data represented in a first format from a naïve client, wherein the naïve client does not support the first format and the write data is represented in a second format. The write data is stored in a pack register, a first cache line of the cache is identified for storing a first portion of the write data, a second cache line of the cache is identified for storing a second portion of the write data, and bytes of the pack register are read and remapped to bytes of the first cache line, wherein the remapping is based on the second format.

Various embodiments of the invention include a system for formatting data using a cache. The system includes the cache and a naïve client configured to produce a read request for a target storing target data represented in a first format, wherein the naïve client does not support the first format. The cache is configured to receive the read request for a target in an external memory that is configured to store target data, identify a first cache line of the cache that stores a first portion of the target data specified by the read request, and identify a second cache line of the cache that stores a second portion of the target data specified by the read request. Bytes of the first cache line are read and remapped to bytes of an unpack register for output to the naïve client, wherein the remapping is based on a second format that is supported by the naïve client.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of ordinary skill in the art that the present invention may be practiced without one or more of these specific details. In other instances, well-known features have not been described in order to avoid obscuring the present invention.

System Overview

Figure 1:
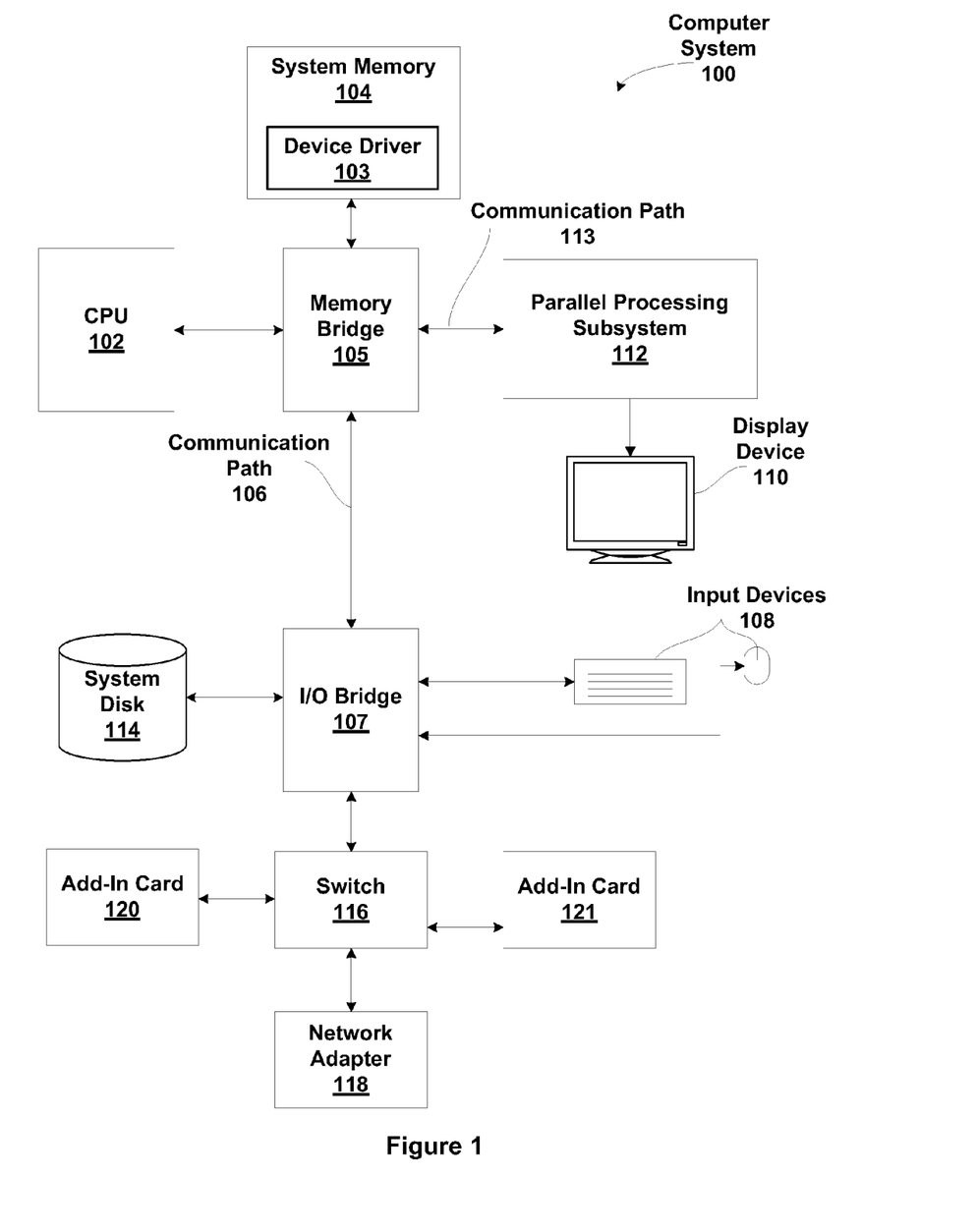
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 that includes a device driver 103. CPU 102 and system memory 104 communicate via a bus path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a peripheral component interconnect (PCI) Express, Accelerated Graphics Port, or HyperTransport link); in one embodiment parallel processing subsystem 112 is a graphics subsystem that delivers pixels to a display device 110 (e.g., a conventional cathode ray tube (CRT) or liquid crystal display (LCD) based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. Communication paths interconnecting the various components in FIG. 1 may be implemented using any suitable protocols, such as PCI, PCI Express (PCI-E), accelerated graphics port (AGP), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
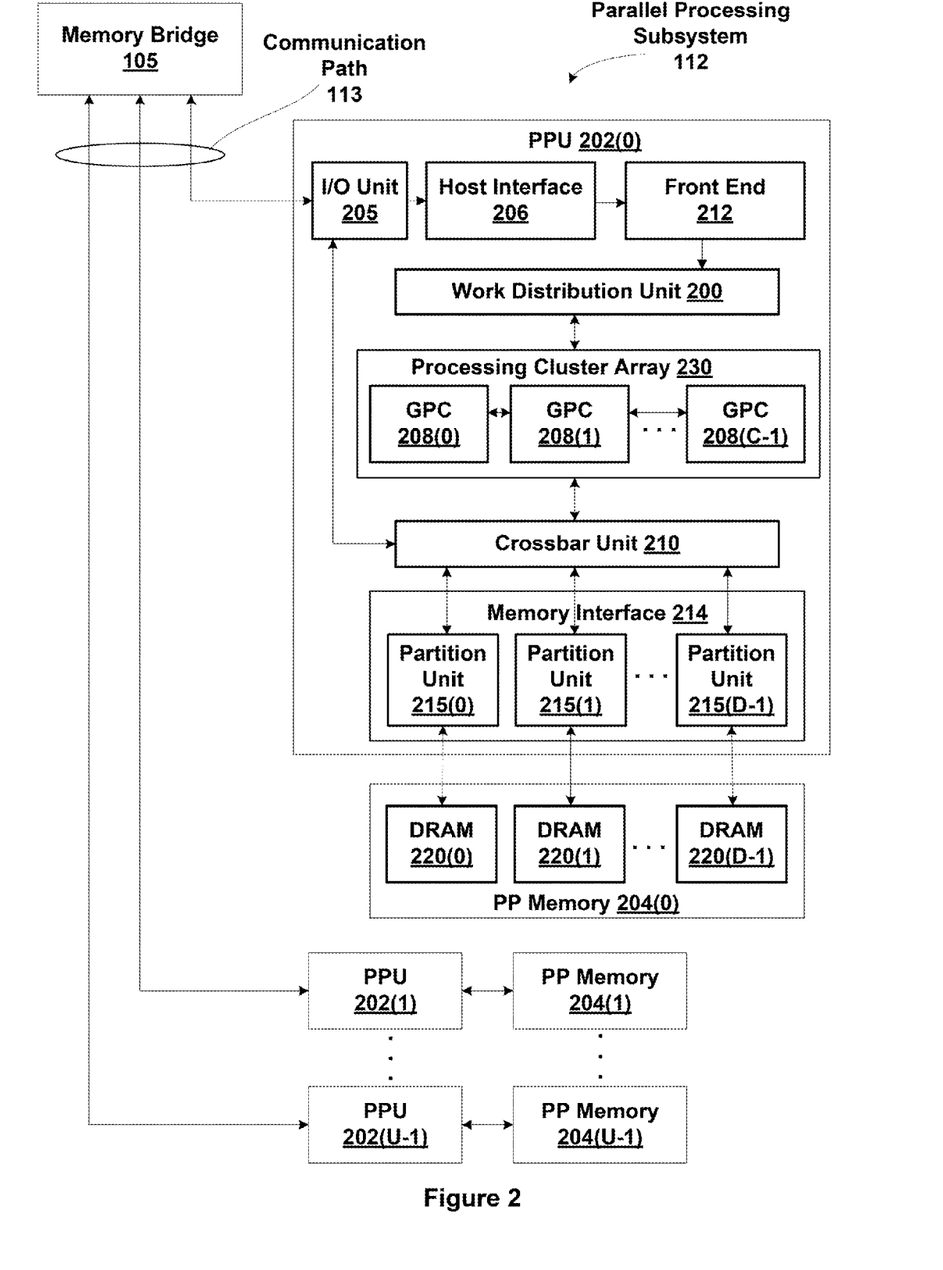
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-E link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in dynamically sized buffers to allow the intermediate data to be transmitted between GPCs 208 for further processing.

Memory interface 214 includes a number D of partition units 215 that are each directly coupled to a portion of parallel processing memory 204, where $D \geq 1$. As shown, the number of partition units 215 generally equals the number of dynamic random access memories (DRAMs) 220. In other embodiments, the number of partition units 215 may not equal the number of memory devices. Persons skilled in the art will appreciate that DRAMs 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the partition units 215 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-E) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
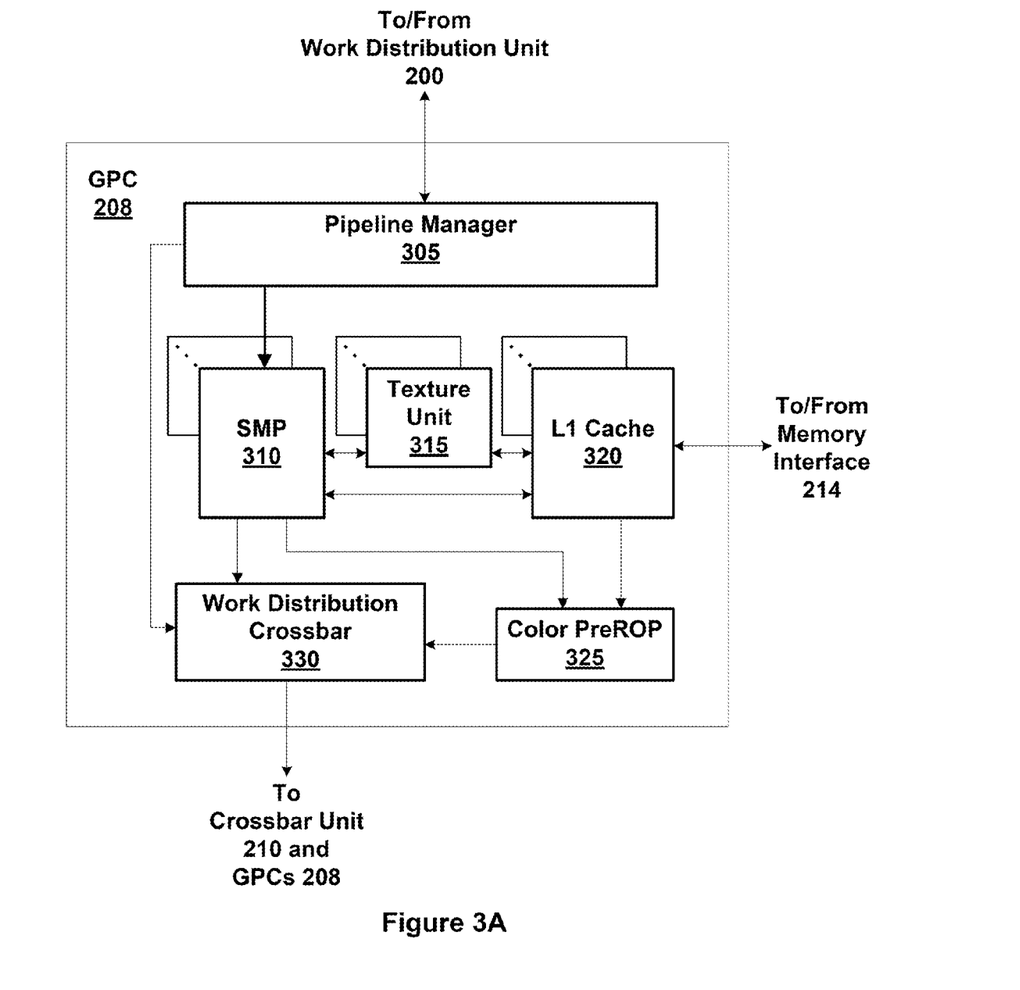
FIG. 3A is a block diagram of a general processing cluster (GPC) within one of the parallel processing units (PPUs) of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In other embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In graphics applications, a GPU 208 may be configured to implement a primitive engine (not shown) for performing screen space graphics processing functions that may include, but are not limited to primitive setup, rasterization, and z culling. In some embodiments, the primitive engine is configured to gather pixels into tiles of multiple neighboring pixels before outputting the pixels to level 1 (L1) cache 320 in order to improve the access efficiency of L1 cache 320. The primitive engine receives a processing task from work distribution unit 200 (FIG. 2), and when the processing task does not require the operations performed by the primitive engine, the processing task is passed through the primitive engine to a pipeline manager 305. Operation of GPC 208 is advantageously controlled via a pipeline manager 305 that distributes processing tasks to streaming multiprocessors (SMPs) 310. Pipeline manager 305 may also be configured to control a work distribution crossbar 330 by specifying destinations for processed data output by SMPs 310. A buffer manager (not shown) within pipeline manager 305 is configured to read and write dynamically sized buffers, as described in conjunction with FIGS. 4, 5A, 5B, 5C, 6A, and 6B.

In one embodiment, each GPC 208 includes a number M of SMPs 310, where M≧1, each SMP 310 configured to process one or more thread groups. Also, each SMP 310 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.), and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SMP 310 is referred to herein as a "warp" or "thread group." As used herein, a "thread group" refers to a group of threads concurrently executing the same program on different input data, with one thread of the group being assigned to a different processing engine within an SMP 310. A thread group may include fewer threads than the number of processing engines within the SMP 310, in which case some processing engines will be idle during cycles when that thread group is being processed. A thread group may also include more threads than the number of processing engines within the SMP 310, in which case processing will take place over consecutive clock cycles. Since each SMP 310 can support up to G thread groups concurrently, it follows that up to G×M thread groups can be executing in GPC 208 at any given time.

Each SMP 310 uses space in a corresponding L1 cache 320 that is used to perform load and store operations. Each SMP 310 also has access to L2 caches within the partition units 215 (FIG. 2) that are shared among all GPCs 208 and may be used to transfer data between threads. Finally, SMP 310 also have access to off-chip "global" memory, which can include, e.g., parallel processing memory 204 (FIG. 2) and/or system memory 104 (FIG. 1). It is to be understood that any memory external to PPU 202 (FIG. 2) may be used as global memory.

In graphics applications, a GPC 208 may be configured such that each SMP 310 is coupled to a texture unit 315 for performing texture mapping operations, e.g., determining texture sample positions, reading texture data, and filtering the texture data. Texture data is read from L1 cache 320 and is fetched from an L2 cache, parallel processing memory 204 (FIG. 2), or system memory 104 (FIG. 1), as needed. Each SMP 310 outputs processed tasks to work distribution crossbar 330 in order to provide the processed task to another GPC 208 for further processing or to store the processed task in an L2 cache, parallel processing memory 204 (FIG. 2), or system memory 104 (FIG. 1) via crossbar unit 210 (FIG. 2). A color preROP (pre-raster operations) 325 is configured to perform optimizations for color blending, organize pixel color data, and perform address translations.

It will be appreciated that the core architecture described herein is illustrative and that variations and modifications are possible. Any number of processing engines, e.g., primitive engines 304, SMPs 310, texture units 315, or color preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

Figure 3B:
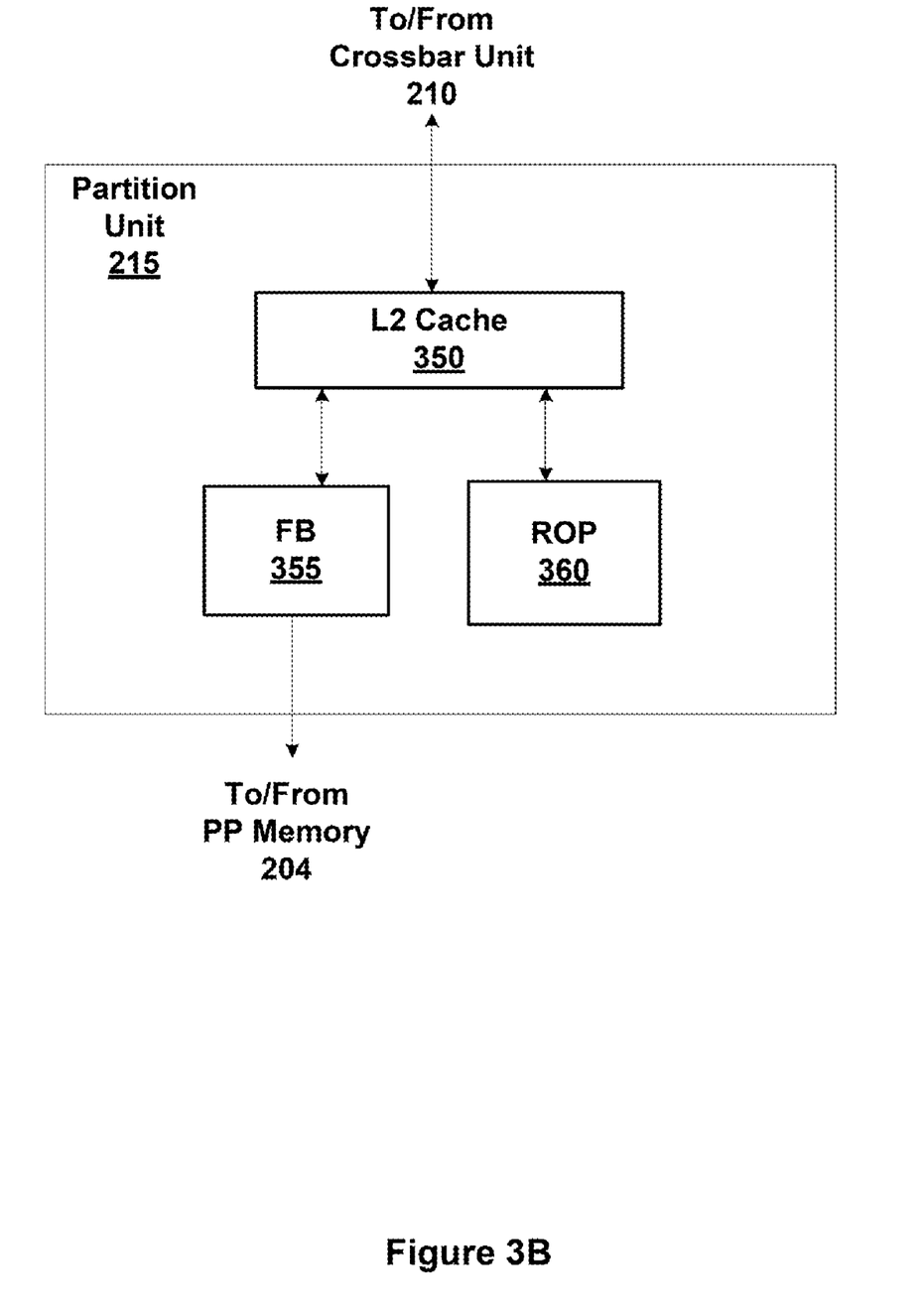
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes an L2 cache 350, a frame buffer (FB) 355, and a raster operations unit (ROP) 360. L2 cache 350 is a read/write cache that is configured to perform load and store operations received from crossbar unit 210 and ROP 360. Each L2 cache 350 is a portion of a large distributed on-chip storage resource that serves as an intermediate point between an external memory (e.g., PP memory 204) and GPCs 208 and ROPs 360. In some embodiments, L2 cache 350 may be split into four (or fewer) slices in order to interface with memory crossbar unit 210 at four times the bandwidth of FB 355. Read misses and urgent writeback requests are output by L2 cache 350 to FB 355 for processing. Dirty updates are also sent to FB 355 for opportunistic processing. FB 355 interfaces directly with parallel processing memory 204, outputting read and write requests and receiving data read from parallel processing memory 204.

In graphics applications, ROP 360 is a processing unit that performs raster operations, such as stencil, z test, and the like, and outputs pixel data as processed graphics data for storage in graphics memory. The processed graphics data may be displayed on display device 110 (FIG. 1) or routed for further processing by CPU 102 (FIG. 1) or by one of the processing entities within parallel processing subsystem 112 of FIG. 1. Each partition unit 215 (FIG. 2) includes a ROP 360 in order to distribute processing of the raster operations. In some embodiments, ROP 360 is configured to compress z or color data that is written to memory and decompress z or color data that is read from memory.

Persons of ordinary skill in the art will understand that the architecture described in FIGS. 1, 2, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing from the scope of the present invention.

Graphics Pipeline Architecture

Figure 4:
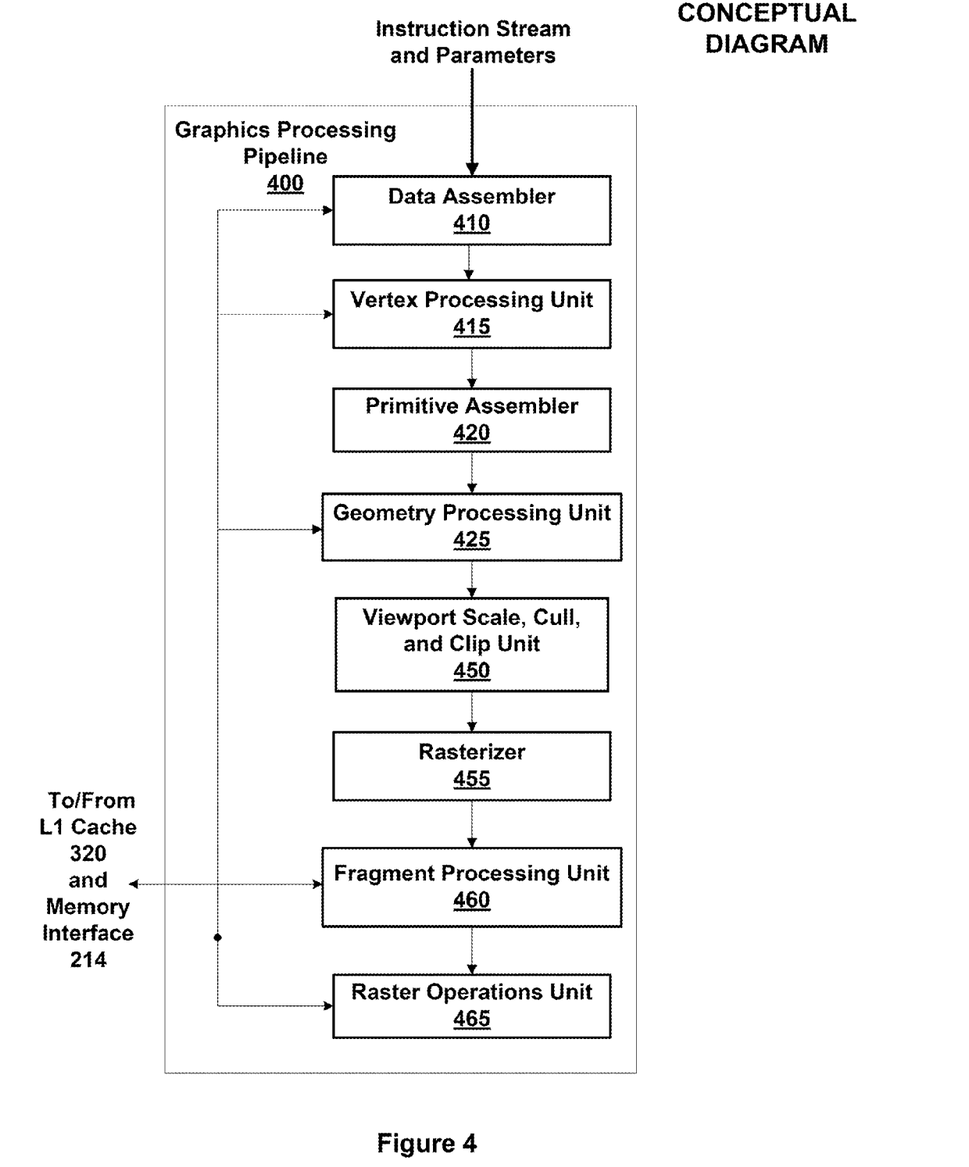
FIG. 4 is a conceptual diagram of a graphics processing pipeline, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SMPs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, L2 cache 350, parallel processing memory 204, or system memory 104 by data assembler 410 for use in processing the vertex data.

Primitive assembler 420 receives vertex attributes from vertex processing unit 415, reading stored vertex attributes via L1 cache 320, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives. In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in L1 cache 320, L2 cache 350, parallel processing memory 204, or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations. Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204, or system memory 104 via L1 cache 320 for use in processing the fragment data. Fragments may be shaded at pixel, sample, or other granularity, depending on the programmed sampling rate.

Raster operations unit 465 is a processing unit that performs raster operations, such as stencil, z test, and the like, and outputs pixel data as processed graphics data for storage in graphics memory. The processed graphics data may be stored in graphics memory, e.g., parallel processing memory 204 and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Using the L2 Cache to Format Data for Naïve Clients

Figure 5A:
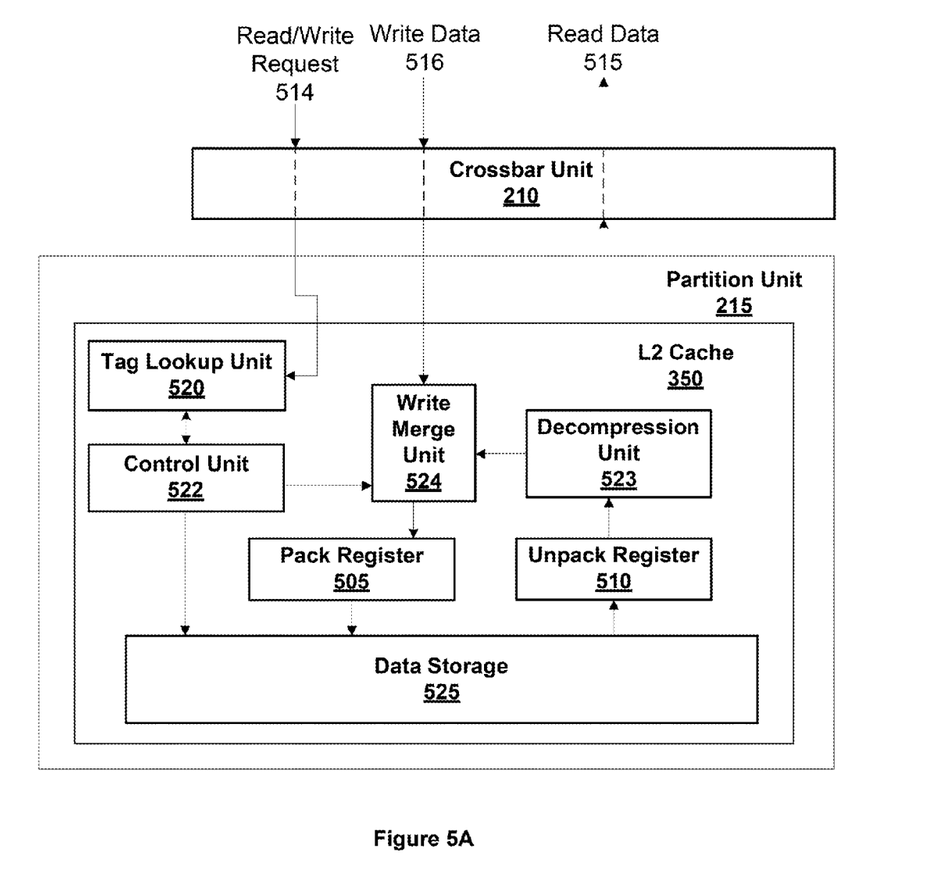
FIG. 5A is a more detailed block diagram of a portion of PPU 202 of FIG. 2, including a crossbar unit and level 2 (L2) cache, according to one embodiment of the present invention.

FIG. 5A is a more detailed block diagram of a portion of PPU 202 of FIG. 2, including crossbar unit 210 and L2 cache 350 (shown in FIG. 3B), according to one embodiment of the present invention. L2 cache 350 is included within partition unit 215 and is coupled to the GPCs 208 via the crossbar unit 210 and to the PP memory 204 via the FB 355 (not shown). Again, while there may be C GPCs 208 and D partition units 215, each including an L2 cache 350, only one GPC 208 and L2 cache 350 is described herein for the sake of simplicity. Similarly, although partition unit 215 includes units other than L2 cache 350, respectively, those units are not shown in FIG. 5A.

Read and write requests are transmitted from some clients (e.g., texture unit 315 and CPU 102) to L2 cache 350 via crossbar unit 210, shown as read/write request 514. L2 cache 350 also receives read and write requests from another client, ROP 360. L2 cache 350 includes an arbiter (not shown) to select between requests received from multiple clients and ROP 360. A data storage 525 within L2 cache 350 is configured to store outgoing data (write data 516) associated with write requests received from clients and incoming data associated with read requests received from clients. Data storage 525 stores cached data that is represented in the data format of the target surface as it is stored in graphics memory. Examples of possible data formats include 128, 64, 32, 16, and 8 bit per pixel color, 24 bit depth and 8 bit stencil, 16 bit depth, 8:1 compressed color, 4:1 compressed color, and the like. Additionally, the data for each pixel may be packed differently depending on the endianness (big or little) of computer system 100. For example, a 16 bit red color component may be stored with the high byte in byte 0 for a big endian system and with the low byte in byte 0 for a little endian system.

Some clients that read and/or write graphics memory through partition unit 215 are "compression and/or packing aware" and others are "naïve." Naïve clients, such as texture unit 315 and CPU 102 may expect data that is read from graphics memory to be returned in a data format that is not compressed nor packed. Similarly, the naïve clients write uncompressed and/or unpacked data to graphics memory. L2 cache 350 includes decompression unit 523 to decompress data that is stored in a compressed format and output to a naïve client to fulfill a read request. Decompression unit 523 is also configured to decompress data when a write request is received that does not write an entire tile. Each tile of a target surface may be compressed independently. When a portion of a compressed tile is written, the tile format changes from compressed to decompressed and a write merge unit 524 combines the decompressed data read from data storage 525 with the client write data 516. Control unit 522 is configured to read one or more cache lines from data storage 525 as needed to gather the bytes needed to fulfill a read request into unpack register 510. Decompression unit 523 then decompresses the unpacked data based on the format expected by the client.

In addition to decompressing data read by naïve clients, L2 cache 350 is also configured to stored compressed data in a smaller footprint within data storage 525. Depending on the compression format, the compressed data is stored in different bytes within a cache line. Control unit 522 selects bytes from one or more cache lines in data storage 525 based on the format that is used to represent the data, and stores the bytes in unpack register 510 for output to the client to fulfill a read request. To fulfill a write request, control unit 522 stores write data 516 into pack register 505 and then selects bytes of the stored write data based on the format that is used to represent the data and stores those bytes into one or more cache lines in data storage 525. Control unit 522 effectively maps the bytes from the target data format to the client format and from the client format to the target data format.

Control unit 522 uses a tag lookup unit 520 to manage the flow of data into and out of data storage 525 and track the format in which the data is stored. Tag lookup unit 520 stores the target data format for each cache line that is resident in data storage 525. Control unit 522 maintains information specifying the data format that each naïve client supports. Upon receiving a read/write request 514, tag lookup unit 520 first looks at the location in data storage 525 corresponding to the memory address in the read/write request 514 to determine whether the data associated with the request is currently residing at, in the case of a read request, or can be written to, in the case of a write request, that location. If so, then, in the case of a write request, control unit 522 causes the data associated with the request, write data 516, to be written to the associated location of data storage 525. For a read request, control unit 522 causes data to be transmitted from data storage 525 to the requesting client as read data 515. If there is a cache miss (meaning that the data associated with the read/write request 514 is not resident at or cannot be written to that location within data storage 525), then control unit 522 implements a series of cache eviction policies based on how the data currently residing in data storage 525 is categorized, as well as the class of that data, to make room for the data associated with the new request.

In one embodiment, data storage 525 includes physically-indexed and tagged set-associative data caches. Each data cache may be divided into multiple segments, where each segment is divided into multiple rows, and each row is divided into multiple cache lines. Data residing in data storage 525 may be transmitted to FB 355 for storage in PP memory 204, and data stored in PP memory 204 may be transmitted via FB 355 for storage in data storage 525. Similarly, data stored in data storage 525 may be transmitted to and from ROP 360.

Data stored in a cache line is categorized as "clean" or "dirty," "pinned" or "unpinned" and also has an eviction class. Stored data is deemed to be clean if the data is coherent with the corresponding data in PP memory 204. Stored data is deemed to be dirty if the data is not coherent with the corresponding data in PP memory 204. Dirty data should be cleaned prior to being evicted. Stored data is deemed to be pinned if that data is the target of an active read or write request, for example, being read or written by a client or when data is being fetched from PP memory 204 in response to a cache miss. Pinned data should not be evicted from data storage 525. Unpinned data constitutes data stored in a cache line of data storage 525 that is not pinned. Data that is unpinned and not dirty is evictable. In addition to being categorized, data stored in data storage 525 is also associated with an eviction class, e.g., first, normal, and buffer.

In one embodiment, the eviction classes are based on the data classes of the client that accesses the data. ROP data is classified as a first eviction class because this data is rarely, if at all, reused and should be evicted first. Texture data is classified as a normal eviction class, because this data is occasionally reused and, therefore, should be stored in data storage 525 for at least a certain period of time. Other data is classified as last eviction class since it is reused by GPCs 208 and, therefore, should be stored in data storage 525 until GPCs 208 no longer need the data. Other embodiments may include more or fewer eviction classes or may present different eviction class hierarchies based on the data classes present in the system.

Figure 5B:
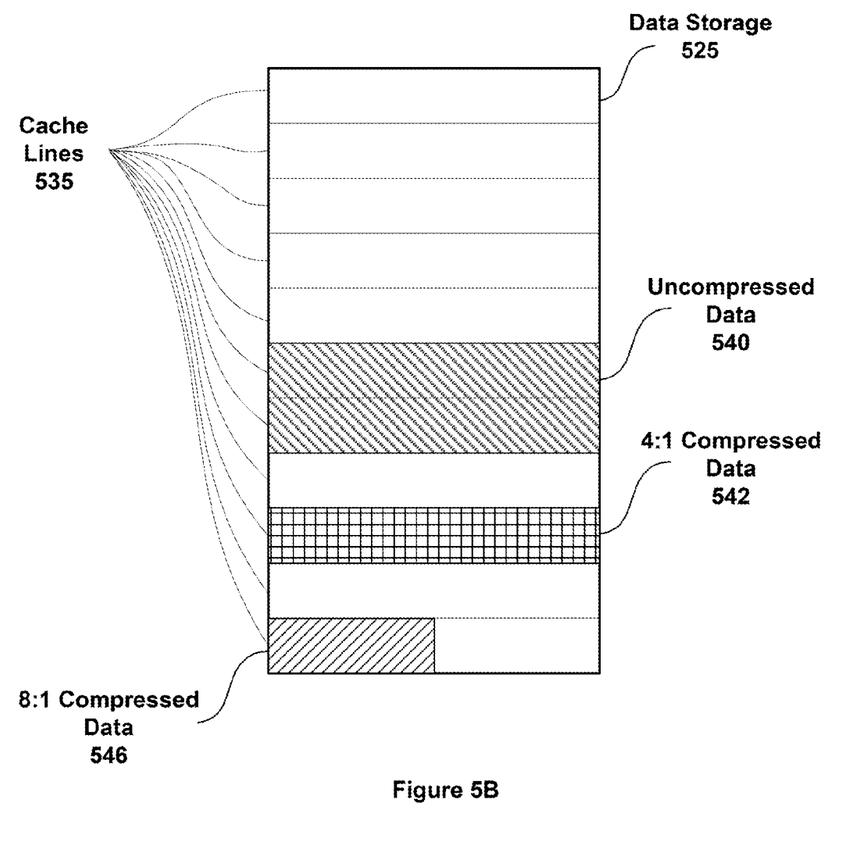
FIG. 5B is a conceptual diagram showing the data formats stored in the data storage of FIG. 5A, according to one embodiment of the present invention.

FIG. 5B is a conceptual diagram showing some of the data formats that may be stored in data storage 525 of FIG. 5A, according to one embodiment of the present invention. As shown, data storage 525 includes data represented in three different formats, uncompressed data 540, 4:1 compressed data 542, and 8:1 compressed data 546. Data storage 525 includes several cache lines 535. In some embodiments of the present invention, each cache line is 32 bytes and read and write requests for graphics memory operate on a cache line granularity. Uncompressed data 540 occupies two cache lines 535, 4:1 compressed data 542 occupies a single cache line 535, and 8:1 compressed data 546 occupies half of a cache line 535. Depending on the data format, different bytes within one or more cache lines 535 store data needed to fulfill a client read or write request. Control unit 522 selects the bytes needed for each read or write request based on the target data format and the client data format to pack, unpack, and decompress the data as needed. In other embodiments of the present invention, the cache line size may be larger or smaller than 32 bytes and the number of cache lines needed to store uncompressed data and/or compressed data may different from what is shown in FIG. 5B.

Figure 5C:
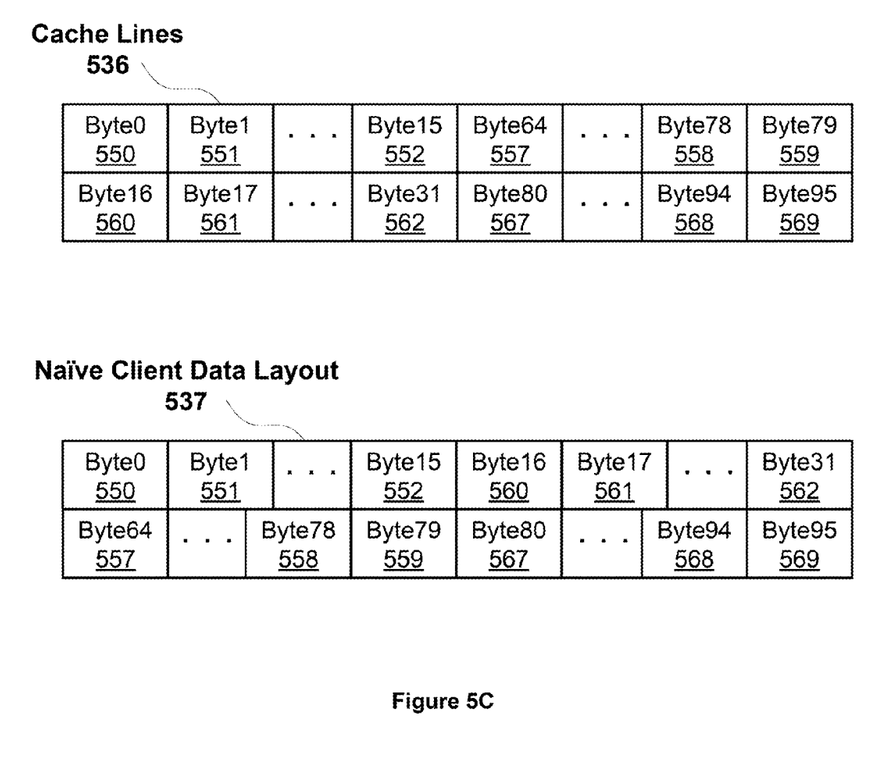
FIG. 5C is a conceptual diagram showing the mapping of data stored in the data storage of FIG. 5A to a data organization for a naïve client, according to one embodiment of the present invention.

FIG. 5C is a conceptual diagram showing the mapping of data stored in data storage 525 of FIG. 5A to a data organization for a naïve client, according to one embodiment of the present invention. Cache lines 536 include two 32 byte cache lines that are stored in data storage 525. The first cache line includes bytes 0 through 15 and bytes 64 through 79, e.g., byte0 550, byte1 551 . . . byte15 552 and byte64 557 . . . byte78 558, and byte79 559. The second cache line includes bytes 16 through 31 and bytes 80 through 95, e.g., byte16 560, byte17 561 . . . byte31 562 and byte80 567 . . . byte94 568, and byte95 569. Bytes 32 through 63 are stored in different cache lines if they are resident in data storage 525. The bytes stored in cache lines 536 do not necessarily map directly to the bytes expected by a naïve client. An example naïve client data layout 537 illustrates one mapping that requires reorganizing the bytes when the data is transferred between the naïve client and data storage 525. As previously described, this reorganization of the bytes is performed by control unit 522 using pack register 505 and unpack register 510.

Figure 6A:
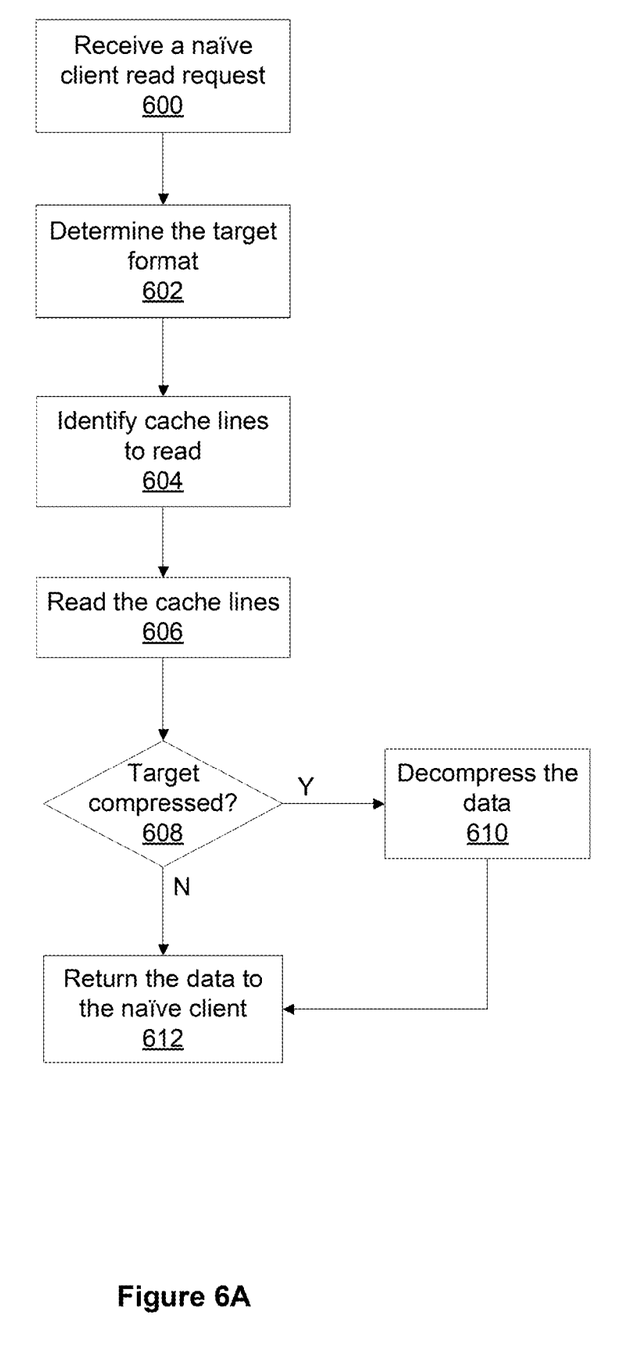
FIG. 6A is a flow diagram of method steps for reading and formatting data, according to one embodiment of the present invention.

FIG. 6A is a flow diagram of method steps for reading and formatting data for a naïve client, according to one embodiment of the present invention. In step 600 control unit 522 receives a naïve client read request specifying a target address. In step 602 control unit 522 accesses tag lookup unit 520 to determine the target data format. If the data is not stored in data storage 525, control unit 522 loads the data into data storage 525, evicting other data as needed. Once the data is stored in data storage 525, the target data format is available in tag lookup unit 520. In step 604 control unit 522 accesses tag lookup unit 520 to identify the one or more cache lines in data storage 525 that are needed to fulfill the read request. In step 606 control unit 522 reads bytes of the one or more cache lines and stores the bytes into unpack register 510, remapping the byte positions as needed based on the naïve client data format.

In step 608 control unit 522 determines whether or not the target format is compressed, and, if so, in step 610 control unit 522 enables decompression unit 523 in order to decompress the data stored in unpack register 510. If, control unit 522 determines that the target format is not compressed, then control unit 522 proceeds directly to step 612. In step 612 control unit 522 outputs the unpacked and formatted data from decompression unit 523 to the naïve client via crossbar unit 210.

Figure 6B:
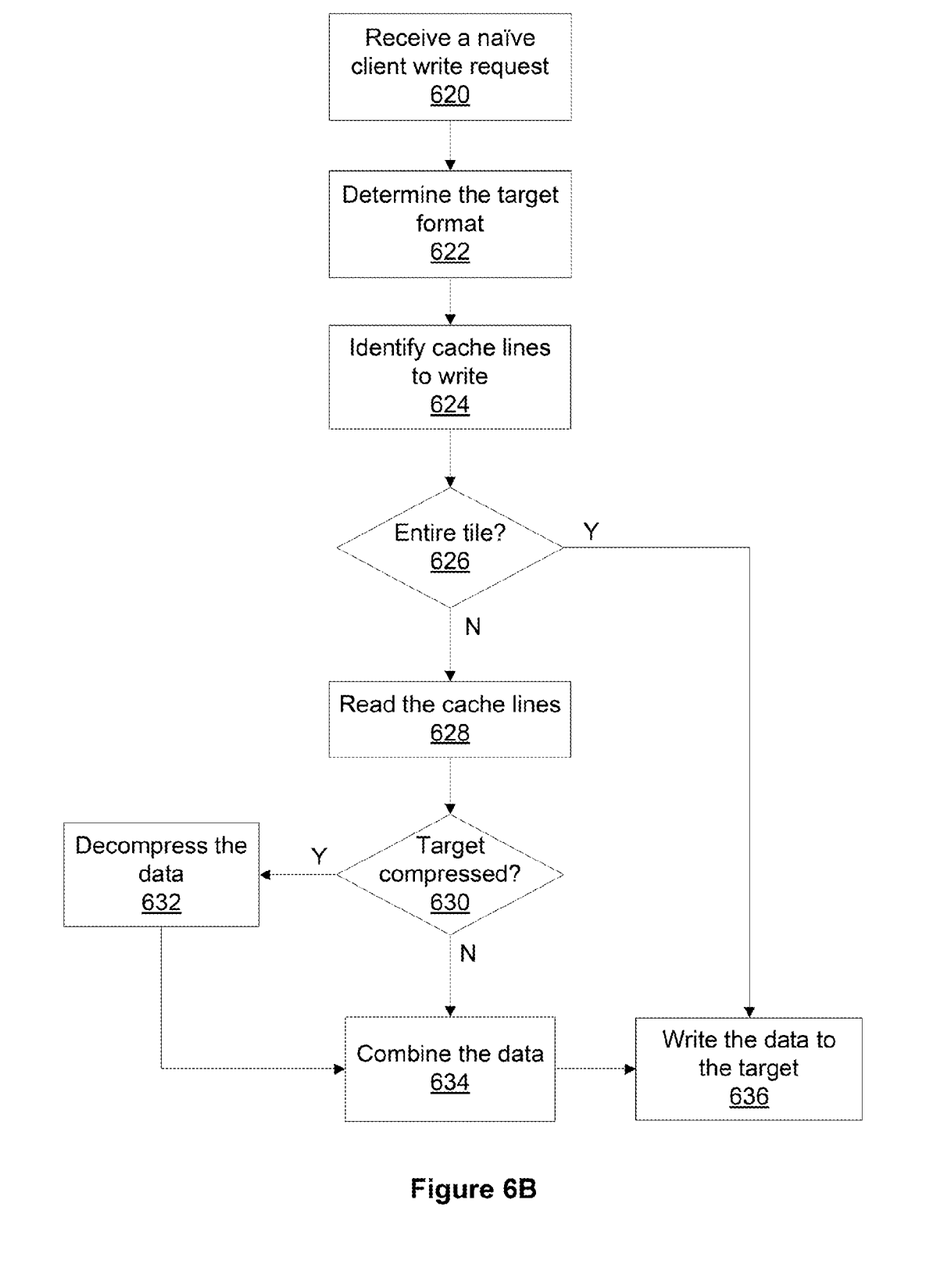
FIG. 6B is a flow diagram of method steps for writing and formatting data, according to one embodiment of the present invention.

FIG. 6B is a flow diagram of method steps for writing and formatting data for a naïve client, according to one embodiment of the present invention. In step 620 control unit 522 receives a naïve client write request specifying a target address for the write data. The write request may include byte enables. In step 622 control unit 522 accesses tag lookup unit 520 to determine the target data format. If the data is not stored in data storage 525, control unit 522 loads the data into data storage 525, evicting other data as needed. Once the data is stored in data storage 525, the target data format is available in tag lookup unit 520. In step 624 control unit 522 accesses tag lookup unit 520 to identify the one or more cache lines in data storage 525 that will be written. In step 626 control unit 522 determines if the write request writes an entire tile, and, if so, control unit 522 proceeds directly to step 636 and writes bytes of the data from pack register 505 to the cache lines identified in step 624, remapping the byte positions as needed based on the target format.

If, in step 626 control unit 522 determines that the write request does not write an entire tile, then in step 628 control unit 522 reads the cache lines identified in step 624, storing them into unpack register 510. In step 630 control unit 522 determines whether or not the target format is compressed, and, if so, in step 632 control unit 522 enables decompression unit 523 in order to decompress the data stored in unpack register 510 before proceeding to step 634. If, in step 630, control unit 522 determines that the target format is not compressed, then control unit 522 proceeds directly to step 634. In step 634 the decompressed (or uncompressed) data is then output to write merge unit 524 and combined with write data 516. In step 636 control unit 522 writes bytes of the data from pack register 505 to the cache lines identified in step 624, remapping the byte positions as needed based on the target format.

Although the method steps of FIGS. 6A and 6B are described in conjunction with FIGS. 1, 2, 3A, 3B, 4, 5A, 5B, and 5C, persons skilled in the art will understand that any system configured to perform the method steps, in any order, falls within the scope of the present invention.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A computer-implemented method for using a cache coupled to one or more clients and to an external memory, the method comprising:
   receiving a read request for a target storing target data represented in a first format from a naïve client, wherein the naïve client does not support the first format;
   identifying a first cache line of the cache that stores a first portion of the target data specified by the read request;
   identifying a second cache line of the cache that stores a second portion of the target data specified by the read request;
   determining a second format that is supported by the naïve client based on client information stored within the cache, wherein the client information specifies the data format that is supported by the naïve client; and
   reading bytes of the first cache line and remapping at least a portion of the bytes of the first cache line to bytes of an unpack register for output to the naïve client, wherein the remapping is based on the second format that is supported by the naïve client.

2. The computer-implemented method of claim 1, further comprising reading bytes of the second cache line and remapping the at least a portion of the bytes of the second cache line to other bytes of the unpack register for output to the naïve client, wherein the remapping of the at least a portion of the bytes of the second cache line is based on the second format that is supported by the naïve client.

3. The computer-implemented method of claim 2, further comprising outputting the bytes of the unpack register and the other bytes of the unpack register to the naïve client to fulfill the read request.

4. The computer-implemented method of claim 3 further comprising, prior to outputting the bytes of the unpack register and the other bytes of the unpack register:
   determining that the first format is a compressed data format; and
   decompressing the bytes of the unpack register and the other bytes of the unpack register.

5. The computer-implemented method of claim 2, further comprising reading an entry in a tag lookup unit that corresponds to the first cache line to determine the first format.

6. The computer-implemented method of claim 1, wherein the first cache line stores 32 bytes.

7. The computer-implemented method of claim 1, wherein the naïve client is configured to perform texture mapping operations and the target data is texture map data.

8. The computer-implemented method of claim 1, further comprising:

receiving a write request including write data for the target from the naïve client, wherein the write data is represented in the second format;

storing the write data in a pack register;

reading bytes of the pack register and remapping at least a portion of the bytes of the pack register to bytes of the first cache line, wherein the remapping of the at least a portion of the bytes of the pack register is based on the first format; and storing the at least a portion of the bytes of the pack register in the first cache line.

9. A computer-implemented method for using a cache coupled to one or more clients and to an external memory, the method comprising:

receiving a write request including write data for a target storing target data represented in a first format from a naïve client, wherein the naïve client does not support the first format;

determining that a second format is supported by the naïve client based on client information stored within the cache and that the write data is represented in the second format;

storing the write data in a pack register;

identifying a first cache line of the cache for storing a first portion of the write data;

identifying a second cache line of the cache for storing a second portion of the write data; and reading bytes of the pack register and remapping at least a portion of the bytes of the pack register to bytes of the first cache line, wherein the remapping is based on the first format.

10. The computer-implemented method of claim 9, further comprising reading other bytes of the pack register and remapping at least a portion of the other bytes of the pack register to bytes of the second cache line, wherein the remapping of the at least a portion of the other bytes of the pack register is based on the first format.

11. The computer-implemented method of claim 10, further comprising storing the first cache line and the second cache line in the external memory.

12. The computer-implemented method of claim 9 further comprising, prior to the step of reading:

determining that the first format is a compressed data format;

reading a portion of the target data for a tile corresponding to the write data;

decompressing the portion of the target data; and merging the portion of the target data with the write data.

13. The computer-implemented method of claim 9, further comprising reading an entry in a tag lookup unit that corresponds to the first cache line to determine the first format.

14. A computer system comprising:

a naïve client configured to produce a read request for a target storing target data represented in a first format, wherein the naïve client does not support the first format; and a cache that is coupled between the naïve client and a memory storing the target data, wherein the cache is configured to:

receive the read request;

identify a first cache line of the cache that stores a first portion of the target data specified by the read request;

identify a second cache line of the cache that stores a second portion of the target data specified by the read request;

determine a second format that is supported by the naïve client based on client information stored within the cache, wherein the client information specifies the data format that is supported by each of one or more clients coupled to the cache; and read bytes of the first cache line and remap the bytes of the first cache line to bytes of an unpack register for output to the naïve client, wherein the remapping is based on the second format that is supported by the naïve client.

15. The system of claim 14, further comprising a crossbar unit coupled between the cache and the naïve client and configured to route the read request from the naïve client to the cache based on a physical memory address.

16. The system of claim 14, wherein the cache is further configured to read bytes of the second cache line and remap at least a portion of the bytes of the second cache line to other bytes of the unpack register for output to the naïve client, wherein the remapping of the at least a portion of the bytes of the second cache line is based on the second format that is supported by the naïve client.

17. The system of claim 16, wherein the cache is further configured to output the bytes of the unpack register and the other bytes of the unpack register to the naïve client to fulfill the read request.

18. The system of claim 17, wherein the cache is further configured to:

determine that the first format is a compressed data format; and decompress the bytes of the unpack register and the other bytes of the unpack register.

19. The system of claim 14, wherein the naïve client is configured to perform texture mapping operations and the target data is texture map data.

20. The system of claim 14, wherein the cache is further configured to:

receive a write request including write data for the target from the naïve client, wherein the write data is represented in the second format;

store the write data in a pack register;

read bytes of the pack register and remap at least a portion of the bytes of the pack register to the bytes of the first cache line, wherein the remapping of the at least a portion of the bytes of the pack register is based on the first format; and store the bytes of the pack register in the first cache line.

* * * * *